(12) United States Patent
Matsushita

(10) Patent No.: US 11,078,955 B2
(45) Date of Patent: Aug. 3, 2021

(54) TAPERED ROLLER BEARING

(71) Applicant: NTN CORPORATION, Osaka (JP)

(72) Inventor: Tomoki Matsushita, Shizuoka (JP)

(73) Assignee: NTN CORPORATION, Osaka (JP)

( * ) Notice: Subject to any disclaimer, the term of this patent is extended or adjusted under 35 U.S.C. 154(b) by 350 days.

(21) Appl. No.: 16/089,506

(22) PCT Filed: Mar. 23, 2017

(86) PCT No.: PCT/JP2017/011660
§ 371 (c)(1),
(2) Date: Sep. 28, 2018

(87) PCT Pub. No.: WO2017/170104
PCT Pub. Date: Oct. 5, 2017

(65) Prior Publication Data
US 2020/0300294 A1 Sep. 24, 2020

(30) Foreign Application Priority Data
Apr. 1, 2016 (JP) .............................. JP2016-074332

(51) Int. Cl.
*F16C 19/36* (2006.01)
*F16C 33/66* (2006.01)
(Continued)

(52) U.S. Cl.
CPC .......... *F16C 19/364* (2013.01); *F16C 33/366* (2013.01); *F16C 33/581* (2013.01);
(Continued)

(58) Field of Classification Search
CPC .... F16C 19/364; F16C 33/366; F16C 33/581; F16C 33/585; F16C 2240/50; F16C 2240/46; F16C 2240/54; F16C 2240/70
(Continued)

(56) References Cited

U.S. PATENT DOCUMENTS 6,311,660 B1 * 11/2001 Sahara ...................... F01L 1/08
123/90.42
6,390,685 B1 * 5/2002 Shimomura ............ F16C 19/26
384/450
(Continued)

FOREIGN PATENT DOCUMENTS

EP         1035339 A1 *  9/2000  ............ F16C 33/366
JP         61-182454     11/1986
(Continued)

OTHER PUBLICATIONS

International Preliminary Report on Patentability dated Oct. 2, 2018 in International (PCT) Application No. PCT/JP2017/011660.
(Continued)

*Primary Examiner* — Marcus Charles
(74) *Attorney, Agent, or Firm* — Wenderoth, Lind & Ponack, L.L.P.

(57) ABSTRACT

Provided is a tapered roller bearing (1, 1', 21) which is to be used for a pilot portion and an idler portion of a synchronous mesh-type transmission in which a component corresponding to a bearing outer ring (3, 23) is formed of a gear (34, 43), wherein a ratio L/Dw of a roller length (L) of a tapered roller (4) serving as a rolling element to a roller diameter (Dw) is set to 1.7 or more, wherein a rolling surface (6) of the tapered roller (4) includes a straight portion (6a) in a center portion of the rolling surface (6) in an axial direction and crowning portions (6b, 6c) extending from the straight portion (6a) to both end portions, and wherein the crowning portions (6b, 6c) are each formed of logarithmic crowning.

5 Claims, 7 Drawing Sheets

(51) Int. Cl.
*F16C 33/58* (2006.01)
*F16C 33/36* (2006.01)
(52) U.S. Cl.
CPC ...... *F16C 2240/50* (2013.01); *F16C 2240/54* (2013.01); *F16C 2240/70* (2013.01)
(58) Field of Classification Search
USPC ................. 384/564–565, 568, 571, 619, 622
See application file for complete search history.

(56) References Cited

U.S. PATENT DOCUMENTS

| | | | |
|---|---|---|---|
| 8,439,574 B2 * | 5/2013 | Matsushita | F16C 33/4676 384/571 |
| 8,858,088 B2 * | 10/2014 | Fujiwara | F16C 33/36 384/568 |
| 2010/0322547 A1 | 12/2010 | Matsushita et al. | |
| 2014/0321789 A1 | 10/2014 | Sato et al. | |

FOREIGN PATENT DOCUMENTS

| | | | | |
|---|---|---|---|---|
| JP | 2001-65574 | | 3/2001 | |
| JP | 2006-322017 | | 11/2006 | |
| JP | 2007-170417 | | 7/2007 | |
| JP | 2008248993 A | * | 10/2008 | ............. F16C 19/26 |
| JP | 2009-68676 | | 4/2009 | |
| JP | 2010106974 A | * | 5/2010 | ............. F16C 19/364 |
| JP | 2010-164179 | | 7/2010 | |
| JP | 5037094 | | 9/2012 | |
| JP | 5163512 | | 3/2013 | |
| JP | 5289746 | | 9/2013 | |
| JP | 2014-77481 | | 5/2014 | |
| JP | 5659724 B2 | * | 2/2015 | ............. F16C 33/34 |
| JP | 2018165552 A | * | 10/2018 | ............. F16C 19/36 |
| JP | 2018165565 A | * | 10/2018 | ............. F16C 33/64 |
| KR | 20000062810 A | * | 10/2000 | ............. F16C 33/585 |
| WO | WO-9902874 A1 | * | 1/1999 | ............. F16C 33/585 |
| WO | WO-2017014001 A1 | * | 1/2017 | ............. F16C 19/36 |
| WO | WO-2018020951 A1 | * | 2/2018 | ............. F16C 33/585 |

OTHER PUBLICATIONS

International Search Report dated Jun. 20, 2017 in International (PCT) Application No. PCT/JP2017/011660.
Chinese Office Action dated Sep. 19, 2019 in corresponding Chinese Application No. 201780021870.9, with English Translation of Search Report.

* cited by examiner

TAPERED ROLLER BEARING

TECHNICAL FIELD

The present invention relates to a tapered roller bearing, and more particularly, to a tapered roller bearing which is to be used for a pilot portion and an idler portion of an automobile transmission (transmission).

BACKGROUND ART

In a tapered roller bearing which is to be used for a pilot portion or an idler portion of an automobile transmission (synchronous mesh-type transmission) illustrated in FIG. 1, a component corresponding to an outer ring is formed of a gear, and the bearing is used under a gap environment or under an environment in which inner and outer rings of the bearing synchronously rotate. A tapered roller bearing of Patent Document 1 has been proposed as such a bearing for an idler of an automobile transmission. This tapered roller bearing is a tapered roller bearing which is to be used for an idler part of an automobile transmission configured to be switched between an idling state in which an outer ring serving also as a gear idles with respect to an inner ring and a shifting state in which the outer ring and the inner ring synchronously rotate, and includes fretting suppressing means.

Nowadays, in order to eliminate stress concentration (edge load) generated at an end portion of a roller due to misalignment of the tapered roller bearing, there has been an attempt to employ logarithmic curve crowning or crowning formed of an arc having a complex curvature in the end portion of a rolling surface of the roller. With regard to the logarithmic curve crowning, in Patent Document 2, there has been proposed a roller bearing and a logarithmic crowning function obtained by modifying the Johns-Gohar's function through introduction of three design parameters thereto.

PRIOR ART DOCUMENTS

Patent Documents

Patent Document 1: JP 5289746 B2
Patent Document 2: JP 5037094 B2

SUMMARY OF THE INVENTION

Problems to be Solved by the Invention

As in the tapered roller bearing which is to be used for the pilot portion and the idler portion of the automobile transmission, when a load is received under the gap environment, as illustrated in FIG. 7, a strong force acts on a small-diameter side or a large-diameter side of a tapered roller 54, 74 (see the portion E in FIG. 7), with the result that a large edge surface pressure is generated. Particularly, in recent years, an engine has been continuously increased in output and reduced in weight, with the result that the problem caused by the edge surface pressure described above is now conspicuous. Under such circumstance, the tapered roller bearing of Patent Document 1 has a configuration of a tapered roller bearing 71 for which importance is placed on a static rated load $C_0r$ with a ratio of the static rated load $C_0r$ to a dynamic rated load Cr satisfying $C_0r/Cr \geq 1.4$ to thereby advantageously suppress fretting wear. However, it was found that demands for the tapered roller bearing 51, 71 which is to be used for the pilot portion and the idler portion of the automobile transmission in recent years cannot be met by employing only the solving means placing importance on the static rated load $C_0r$.

Moreover, when the tapered roller bearing 51, 71 is used under the gap environment, the edge surface pressure becomes larger on the small-diameter side or the large-diameter side of the tapered roller 54, 74. Thus, as a countermeasure therefor, it is conceivable to form large crowning. When such large crowning is to be formed, in consideration of manufacturing cost, it is preferred that large crowning be formed in the tapered roller serving as a rolling element and that the inner and outer rings each have a raceway surface which has a single-curve crowning shape with a small curvature or a straight shape without a crowning shape.

However, when the tapered roller bearing 51, 71 is used under the gap environment, the tapered roller is liable to skew due to the influence of the gap. In addition, there has also been found a problem in that, when the large crowning is formed, a contact width between a rolling surface of the tapered roller and the raceway surfaces of the inner and outer rings becomes smaller, with the result that the tapered roller becomes more liable to skew. Therefore, the inventor of the present invention has arrived at an idea that, in order to allow the tapered roller to be less liable to skew in the tapered roller bearing which is to be used for the pilot portion and the idler portion of the automobile transmission, it is required that the rolling surface of the tapered roller or the raceway surfaces of the inner and outer rings have a larger straight portion or smaller crowning. However, no specific proposal as to the pilot portion or the idler portion of the automobile transmission has been given, and the present invention has been made with focus on this problem.

In view of the problems described above, the present invention has an object to provide a tapered roller bearing which is to be used for a pilot portion and an idler portion of an automobile transmission, and is capable of suppressing an edge surface pressure, preventing fretting wear and skew, and achieving a long lifetime at low cost.

Solution to the Problems

As a result of various studies having been made to achieve the object described above, the inventor of the present invention has achieved the present invention based on a design concept of a tapered roller bearing to which an elongated roller is incorporated with placement of importance on the static rated load $C_0r$, and based on a novel idea of sufficiently securing a straight portion based on a proportion of a roller which is elongated in an axial direction and forming the logarithmic crowning at each of both end portions.

According to one embodiment of the present invention, which has been devised as a technical measure to achieve the above-mentioned object, there is provided a tapered roller bearing which is to be used for a pilot portion and an idler portion of a synchronous mesh-type transmission in which a component corresponding to a bearing outer ring is formed of a gear, wherein a ratio L/Dw of a length L of a tapered roller serving as a rolling element to a roller diameter Dw is set to 1.7 or more, wherein a rolling surface of the tapered roller comprises a straight portion in a center portion of the rolling surface in an axial direction and crowning portions extending from the straight portion to both end portions, and wherein the crowning portions are each formed of logarithmic crowning.

With the configuration described above, the edge surface pressure can be suppressed, and the fretting wear and skew can be prevented. Further, a long lifetime of the tapered roller bearing which is to be used for the pilot portion and the idler portion of the automobile transmission can be achieved at low cost. The "logarithmic crowning" described in Description and Claims includes, in addition to crowning formed of a logarithmic curve, crowning which is formed of a plurality of smoothly connected arcs having different curvatures and is approximate to the logarithmic curve.

It is preferred that a width of the straight portion fall within a range of from 50% to 85% of an effective rolling surface width of the tapered roller. With this, skew is suppressed, and the contact surface pressure is reduced. Moreover, ease of processing is excellent, and the manufacturing cost can be reduced.

It is preferred that a ratio Dr/Dw of a drop amount Dr of a crowning portion of the rolling surface to the roller diameter Dw fall within a range of from 0.003 to 0.03. With this, the edge surface pressure can be set to a proper value.

When a roller filling ratio of the tapered roller bearing is set to 90% or more, the contact surface pressure is reduced, and the anti-fretting characteristic is improved. Moreover, the fatigue lifetime can be secured more stably.

It is preferred that a raceway surface width of an inner ring of the tapered roller bearing be larger than a rolling surface width of the tapered roller, and a raceway surface of the inner ring comprise a grind-finished surface having a roughness within a range of from 0.1 µRa to 0.4 µRa. With this, superfinishing on the raceway surface is omitted, and the raceway surface is subjected to finish-grinding. Thus, the roughness thereof can be reduced to a range of from 0.1 µm to 0.4 µm, thereby being capable of reducing the cost.

When a gap formed between a small flange surface of the inner ring of the tapered roller bearing and a small end surface of the tapered roller is 0.3 mm or less, the effect of suppressing skew can be attained. Further, the adapting rotation performed at the time of assembly of the tapered roller bearing is reduced, thereby improving ease of assembly.

Effects of the Invention

According to the present invention, the edge surface pressure can be suppressed, and the fretting wear and skew can be prevented. Further, a long lifetime of the tapered roller bearing which is to be used for the pilot portion and the idler portion of the automobile transmission can be achieved at low cost.

EMBODIMENTS OF THE INVENTION

With reference to FIG. 1 to FIG. 5, description is made of a tapered roller bearing according to a first embodiment of the present invention. First, with reference to FIG. 1, description is made of an outline of an automobile transmission for which the tapered roller bearing according to the first embodiment is to be used.

Figure 1:
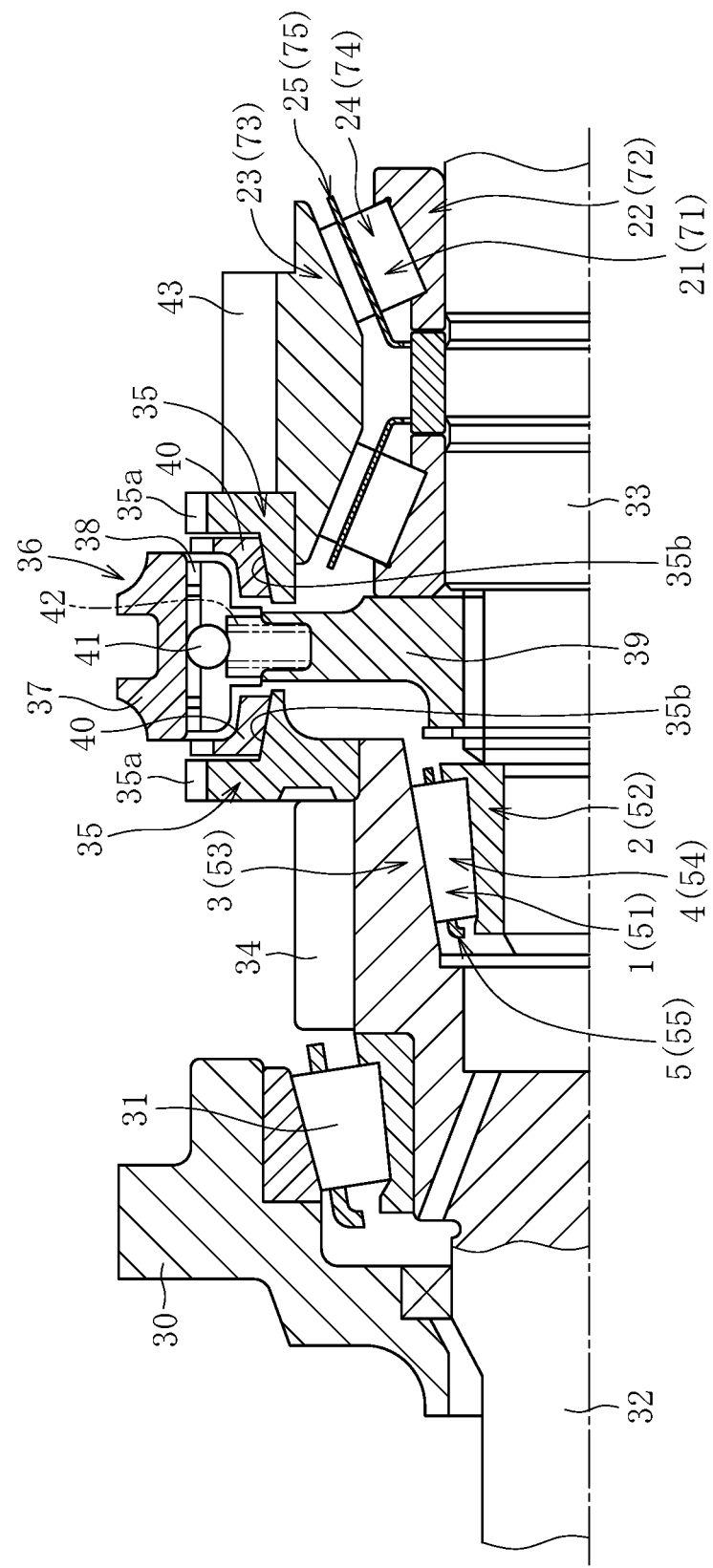
FIG. 1 is a vertical sectional view for illustrating part of an automobile transmission for which a tapered roller bearing according to the present invention is to be used.

FIG. 1 is an illustration of an example of an automobile transmission to which the tapered roller bearing according to the first embodiment is to be mounted, and is a vertical sectional view for illustrating only part of the automobile transmission in an upper half from a center line. This transmission is a synchronous mesh-type transmission. An input shaft 32 is rotatably supported by a mission case 30 through intermediation of a rolling bearing 31, and a main shaft 33 is arranged coaxially with the input shaft 32. The input shaft 32, the main shaft 33, and a countershaft (not shown) which is arranged in parallel with the input shaft 32 and the main shaft 33 at a predetermined interval are rotatably supported by the mission case 30. An input shaft gear (hereinafter also simply referred to as "gear") 34 is provided integrally with the input shaft 32, and is always in mesh with a countershaft gear (hereinafter also simply referred to as "gear") of the countershaft (not shown). The input shaft 32 and the main shaft 33 are supported by a tapered roller bearing 1 for a pilot portion so as to be rotatable relative to each other. The tapered roller bearing 1 for the pilot portion is mounted between a radially inner surface of the input shaft 32 and a radially outer surface of the main shaft 33. The tapered roller bearing 1 for the pilot portion corresponds to the tapered roller bearing according to the first embodiment of the present invention.

Moreover, a main shaft gear (hereinafter also simply referred to as "gear") 43 is rotatably mounted to the main shaft 33 through intermediation of a tapered roller bearing 21 for an idler portion. The main shaft gear 43 is always in mesh with the gear of the countershaft (not shown). The tapered roller bearing 21 for the idler portion corresponds to the tapered roller bearing according to the first embodiment.

An inner ring 2 of the tapered roller bearing 1 for the pilot portion is mounted to the radially outer surface of the main shaft 33 by fitting. An outer ring 3 of the tapered roller bearing 1 for the pilot portion is formed of a hollow shaft portion formed at one end portion of the input shaft 32, and has the gear 34 on an outer periphery thereof. That is, the outer ring 23 is formed as a component serving also as the gear 34, and is formed integrally with the input shaft 32. The gear 34 is in mesh with the gear of the countershaft (not shown) as described above. A dog clutch 35 is coupled to a portion of the input shaft 32 which is adjacent to the gear 34. The dog clutch 35 integrally comprises dog teeth 35a on an outer periphery thereof and a cone 35b having a tapered shape on one side thereof. A synchro mechanism 36 is arranged close to the dog clutch 35.

An inner ring 22 of the tapered roller bearing 21 for the idler portion is mounted to the radially outer surface of the main shaft 33 by fitting. The outer ring 23 of the tapered roller bearing 21 for the idler portion has the gear 43 formed on an outer periphery thereof in mesh with the gear of the countershaft (not shown). That is, the outer ring 3 is formed as a component serving also as the gear 43. Similarly to the gear 34 of the input shaft 32, another dog clutch 35 is coupled to a portion of the main shaft 33 which is adjacent to the gear 43. The dog clutch 35 integrally comprises dog teeth 35a on an outer periphery thereof and a cone 35b having a tapered shape on one side thereof. The synchro mechanism 36 is arranged close to the dog clutch 35.

The synchro mechanism 36 comprises a sleeve 37, a synchronizer key 38, a hub 39, a synchronizer ring 40, a pressing pin 41, and a spring 42. The sleeve 37 is configured to move in an axial direction (right-and-left direction in FIG. 1) by an operation of a selector (not shown). The synchronizer key 38 is mounted to an inner periphery of the sleeve 37 so as to be movable in the axial direction. The hub 39 is engaged with and coupled to an outer peripheral surface of the main shaft 33. The synchronizer ring 40 is slidably mounted to outer peripheral surfaces of the cones 35b of the dog clutches 35. The pressing pin 41 and the spring 42 are configured to elastically press the inner periphery of the synchronizer key 38.

In the state illustrated in FIG. 1, the sleeve 37 and the synchronizer key 38 are held at a neutral position by the pressing pin 41. At this time, the input shaft gear 34 rotates the countershaft gear (not shown), and this rotation causes the main shaft gear 43 to rotate through another countershaft gear. Thus, the tapered roller bearing 1 for the pilot portion and the tapered roller bearing 21 for the idler portion are in a rotating state relative to the main shaft 33.

When the sleeve 37 moves from the state illustrated in FIG. 1 toward the right side in the axial direction by the operation of the selector, the synchronizer key 38 follows the movement of the sleeve 37 to move toward the right side in the axial direction and press the synchronizer ring 40 against an inclined surface of the cone 35b of the dog clutch 35. With this, the rotation speed of the dog clutch 35 is reduced, whereas the rotation speed on the synchro mechanism 36 side is increased. Then, when the rotation speeds of the dog clutch 35 and the synchro mechanism 36 are synchronized, the sleeve 37 further moves toward the right side in the axial direction, and the synchronizer key 38 is brought into mesh with the dog teeth 35a of the dog clutch 35. As a result, the main shaft gear 43 and the main shaft 33 are coupled to each other through intermediation of the synchro mechanism 36. With this, rotation of the countershaft gear is transmitted to the main shaft gear 43, and the main shaft 33 rotates at a predetermined transmission ratio. At this time, the main shaft gear 43 rotates synchronously with the main shaft 33 and the inner ring 22 of the tapered roller bearing 21. In contrast, when the sleeve 37 moves toward the left side in the axial direction from the state illustrated in FIG. 1, the input shaft 32 and the main shaft 33 are directly coupled to each other through intermediation of the synchro mechanism 36. Thus, the input shaft 32 rotates synchronously with the main shaft 33 and the inner ring 22.

The tapered roller bearing 1 for the pilot portion comprises the input shaft 32, the outer ring 3 being a component serving also as the gear 34, the inner ring 2, tapered rollers 4, and a retainer 5. The tapered roller bearing 21 for the idler portion comprises the outer ring 23 being a component serving also as the main shaft gear 43, the inner ring 22, double-row tapered rollers 24, and a retainer 25.

The input shaft 32 and the main shaft 33 illustrated in FIG. 1 have a structure of allowing slight relative movement in the axial direction. Therefore, the tapered roller bearing 1 for the pilot portion and the tapered roller bearing 21 for the idler portion have a bearing inner gap used under the gap environment. In addition, at the time of change in speed described above, through synchronous rotation of the input shaft 32 and the main shaft 33 with the inner ring 22 or synchronous rotation of the main shaft gear 43 with the main shaft 33 and the inner ring 22, the tapered rollers 4, 24 being rolling elements are brought into a state of being stopped on raceway surfaces of the inner and outer rings 2, 3, 22, 23. In such a state, when vibration or the like from the outside repeatedly acts, repeated small slipping occurs between the tapered rollers 4, 24 and the raceway surfaces of the inner and outer rings 2, 3, 22, 23. As a result, there is a case of causing the problem of fretting in which the contact surfaces are worn.

Figure 2:
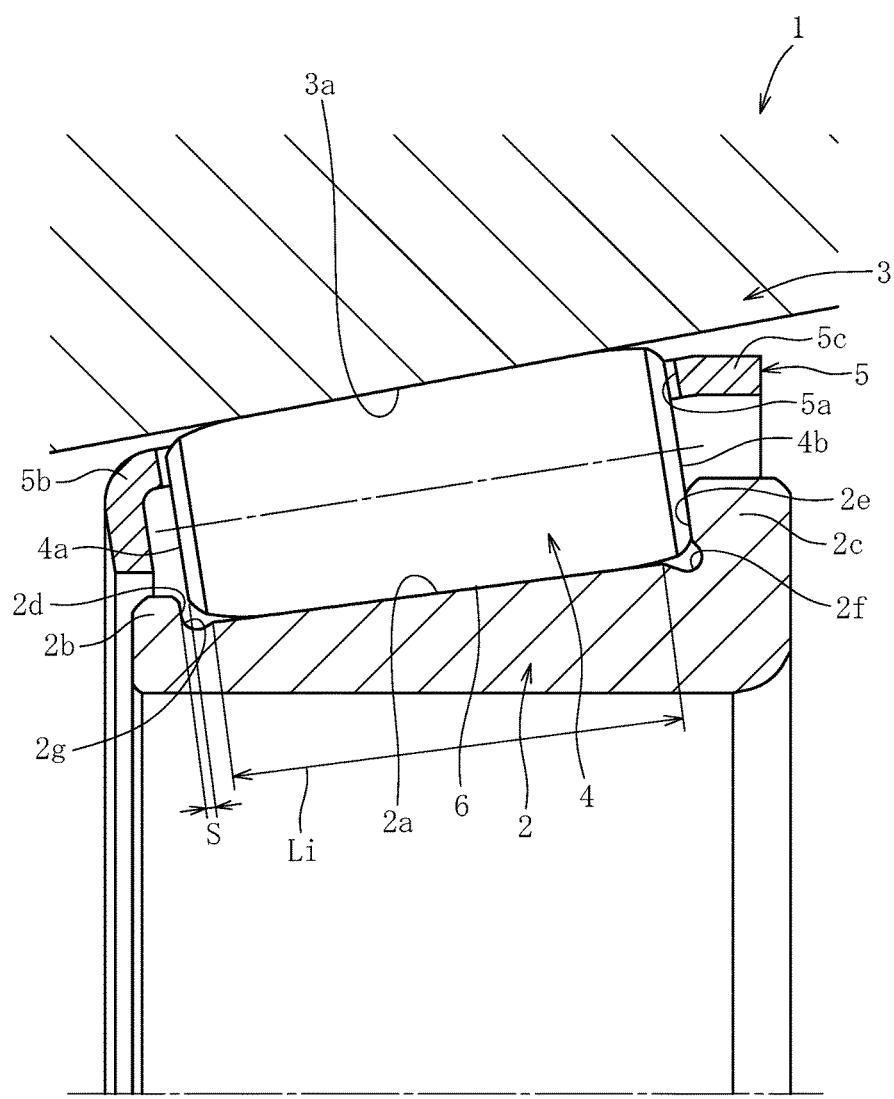
FIG. 2 is a vertical sectional view of a tapered roller bearing according to a first embodiment of the present invention.

Next, with reference to FIG. 2 to FIG. 5, description is made of details of the tapered roller bearing according to the first embodiment. The tapered roller bearings which are to be used for the pilot portion and the idler portion are used under similar environments as described above. Therefore, in the first embodiment, description is made of the tapered roller bearing for the pilot portion as an example, and description of the tapered roller bearing for the idler portion is omitted. FIG. 2 is a vertical sectional view of the tapered roller bearing according to the first embodiment.

The tapered roller bearing 1 comprises the inner ring 2, the outer ring 3, the tapered rollers 4 incorporated between the inner ring 2 and the outer ring 3, and the retainer 5 configured to retain the tapered rollers 4. The inner ring 2 has a raceway surface 2a having a tapered shape on an outer periphery thereof. The inner ring 2 has a small flange portion 2b on a small-diameter side, and has a large flange portion 2c on a large-diameter side. The outer ring 3 has a raceway surface 3a having a tapered shape on an inner periphery thereof. The plurality of tapered rollers 4 are incorporated between the raceway surface 3a of the outer ring 3 and the raceway surface 2a of the inner ring 2. The tapered rollers 4 are received in pockets 5a of the retainer 5, and are retained at equal intervals in the circumferential direction.

A ground relief portion 2f is formed at a corner portion at which the raceway surface 2a of the inner ring 2 and a large flange surface 2e of the large flange portion 2c intersect each other, and a ground relief portion 2g is formed at a corner portion at which the raceway surface 2a and a small flange surface 2d of the small flange portion 2b intersect each other. A generating line of the raceway surface 2a extending in the axial direction has a linear shape. Moreover, a generating line of the raceway surface 3a of the outer ring 3 extending in the axial direction also has a linear shape. The raceway surface 2a of the inner ring 2 has the ground relief portions 2f and 2g, and hence an effective raceway surface width Li of the raceway surface 2a is smaller than an effective rolling surface width Le (see FIG. 4) of a rolling surface 6 of the tapered roller 4. Such difference may be disadvantageous in terms of contact surface pressure.

Figure 3:
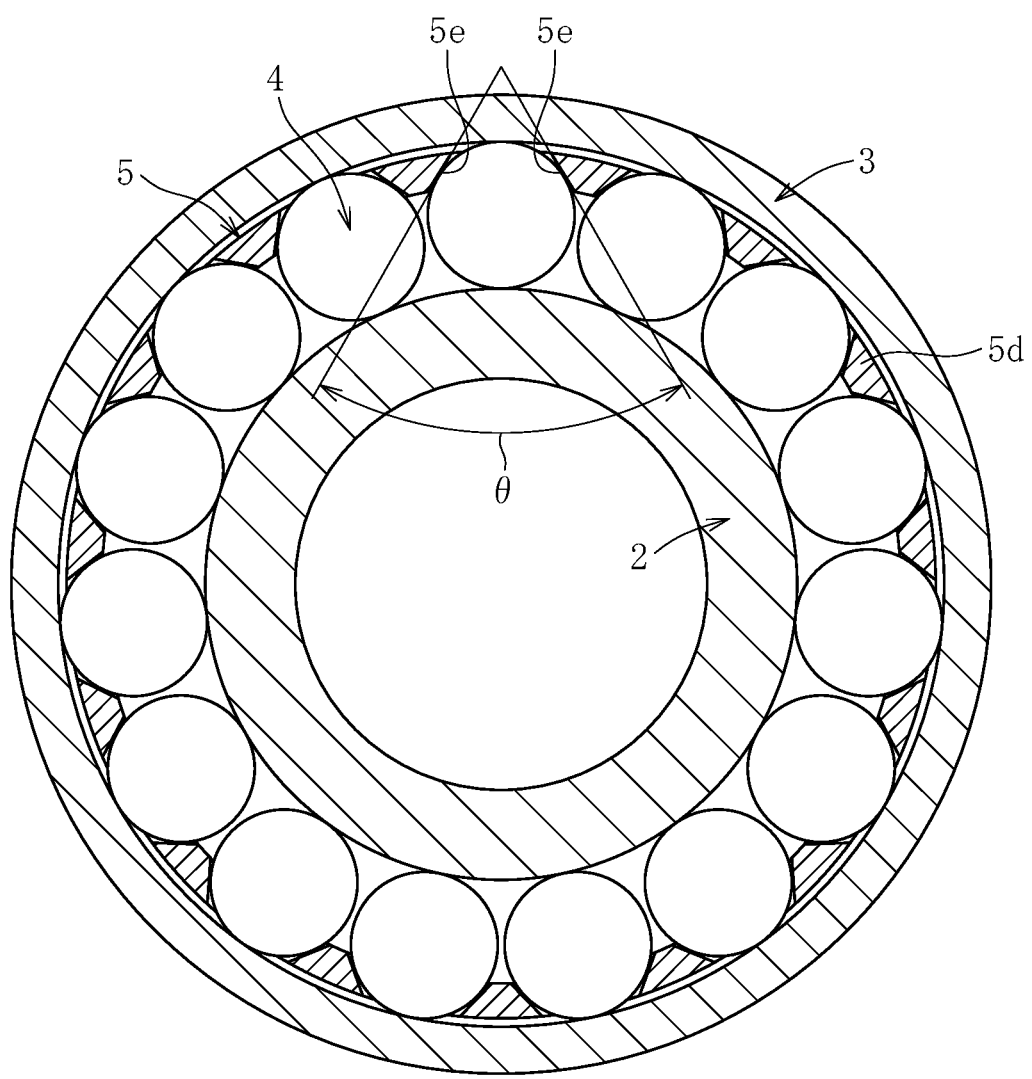
FIG. 3 is a transverse sectional view of the tapered roller bearing of FIG. 2.
Figure 4:
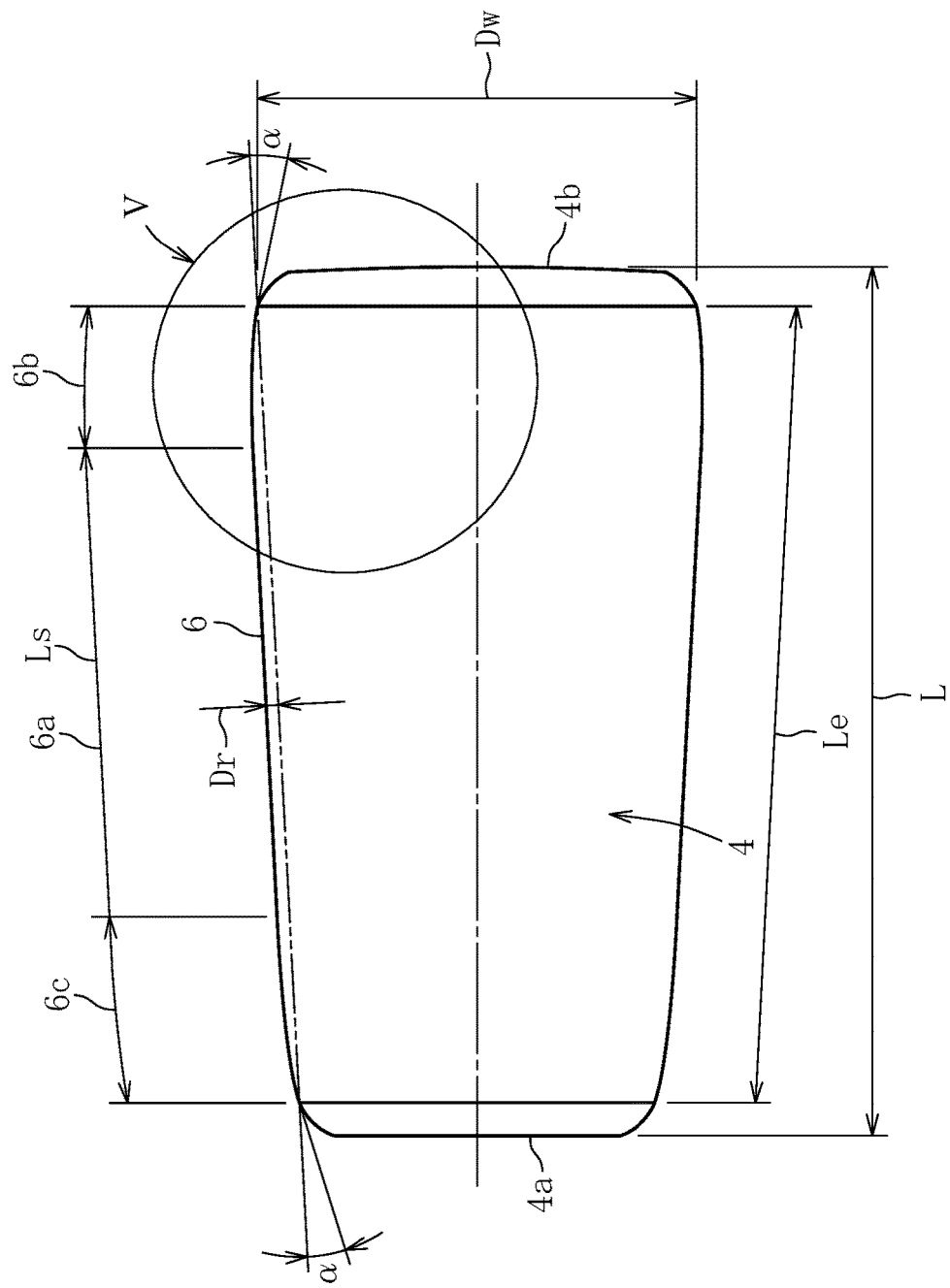
FIG. 4 is an enlarged front view of a tapered roller of FIG. 2.

The rolling surface 6 having a tapered shape is formed on an outer periphery of the tapered roller 4. The tapered roller 4 has a small end surface 4a on a small-diameter side, and has a large end surface 4b on a large-diameter side. The large end surface 4b of the tapered roller 4 is received by the large flange surface 2e of the inner ring 2. As illustrated in FIG. 4, the rolling surface 6 of the tapered roller 4 comprises a straight portion 6a formed at a center portion in the axial direction and crowning portions 6b and 6c formed at both end portions. The drop amounts of the crowning portions 6b and 6c are illustrated in FIG. 4 with emphasis. Details of the crowning portions 6b and 6c are described later. As illustrated in FIG. 2, the retainer 5 comprises a small-diameter-side annular portion 5b, a large-diameter-side annular portion 5c, and a plurality of pillar portions 5d (see FIG. 3)

connecting the small-diameter-side annular portion 5b and the large-diameter-side annular portion 5c to each other in the axial direction.

Figure 5:
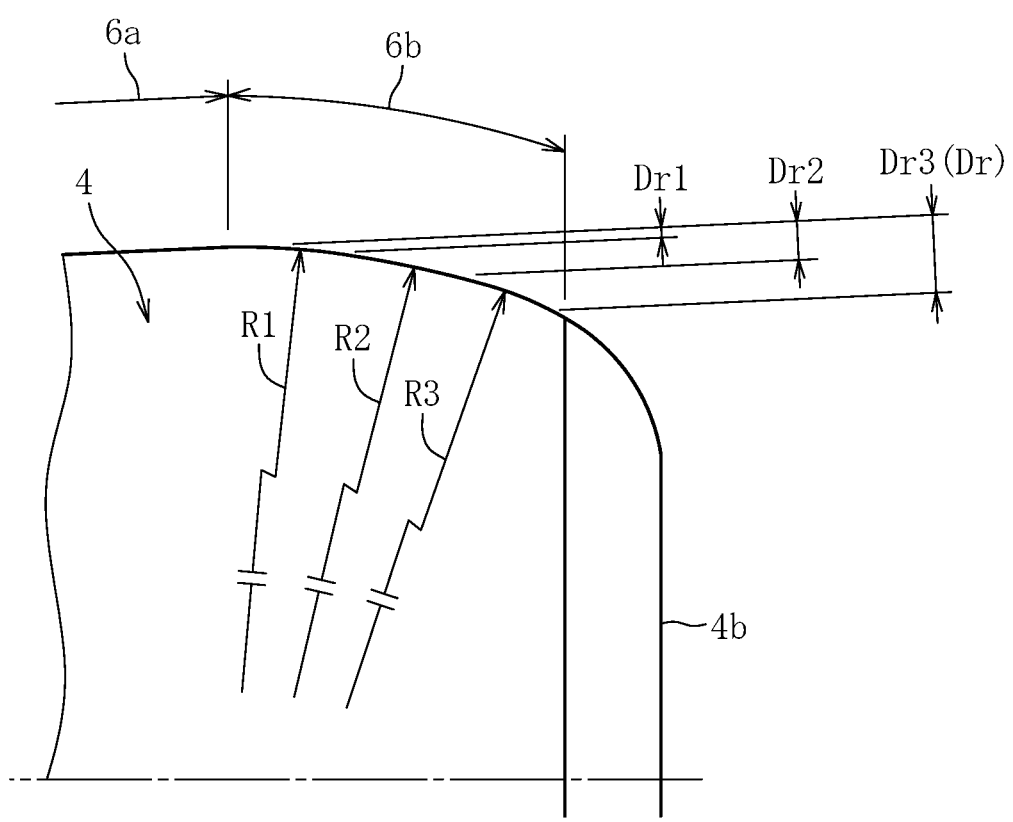
FIG. 5 is an enlarged view of the portion V of FIG. 4.

In the above, description is made of the outline of the tapered roller bearing according to the first embodiment. Next, with reference to FIG. 3 to FIG. 5, description is made of a characterizing configuration of the tapered roller bearing according to the first embodiment. FIG. 3 is a transverse sectional view of the tapered roller bearing of FIG. 2. FIG. 4 is an enlarged front view of the tapered roller of FIG. 2. FIG. 5 is an enlarged view of the portion B of FIG. 4.

As illustrated in FIG. 4, in the tapered roller 4, in addition to the design concept of the tapered roller bearing for which importance is placed on the static rated load $C_0r$, based on the proportion of the roller elongated in the axial direction in this design concept, the straight portion is sufficiently provided on the rolling surface 6, and logarithmic crowning is formed at each of both end portions.

With regard to the logarithmic crowning described above, the generating line of the crowning portion 6b is determined, for example, based on the logarithmic curve of the logarithmic crowning expressed by the following expression. This logarithmic crowning expression is cited from Japanese Patent No. 5037094 applied by the applicant of the present application.

$$z(y) = K_1 A \ln \frac{1}{1 - \left\{1 - \exp\left(-\frac{z_m}{K_1 A}\right)\right\}\left(\frac{y-a}{K_2 a} + 1\right)^2} \quad \text{[Expression 1]}$$

A: $=2Q/\pi l E'$
a: Length from an original point O to an end of an effective contact portion
E': Equivalent elastic modulus
$K_1$: Parameter representing a degree of a curvature of crowning
$K_2$: Parameter representing a ratio of crowning length with respect to "a"
I: Length of an effective contact portion in a generating line direction
Q: Load
Y: Position of the contact portion in the generating line direction
z(y): Drop amount at an axial position "y"
$z_m$: Parameter representing an optimum value of a maximum drop amount of crowning at an end in an effective length of a roller The design parameters $K_1$, $K_2$, and $z_m$ in the logarithmic crowning expression described above are subjected to design. Description is made of a mathematical optimization method for the logarithmic crowning. Through determination of the design parameter $K_2$ and appropriate selection of $K_1$ and $z_m$ in the function expression expressing the logarithmic crowning, optimum logarithmic crowning can be designed. In general, the crowning is designed so as to reduce the surface pressure of the contact portion or a maximum value of stress. It is assumed that the rolling fatigue lifetime occurs in accordance with the von Mises yield criterion, and the parameters $K_1$ and $z_m$ are selected so as to minimize a maximum value of the von Mises equivalent stress. The parameters $K_1$ and $z_m$ can be selected with use of an appropriate mathematical optimization method. Various algorithms for mathematical optimization methods have been proposed, and the direct search method as one example is capable of executing optimization without use of derivatives of function, and is effective for a case in which an objective function and variables cannot be directly expressed with use of expressions. In this case, the parameters $K_1$ and $z_m$ are determined with use of the Rosenbrock method as one of direct search methods.

The shape of each of the crowning portions 6b and 6c of the tapered roller 4 in the first embodiment is the logarithmic curve crowning determined by the expression described above. However, the shape is not limited to that determined by the expression described above, but the logarithmic curve may be determined with use of another logarithmic crowning expression.

The crowning portions 6b and 6c of the tapered roller 4 illustrated in FIG. 4 each have crowning having a shape approximate to the logarithmic curve of the logarithmic crowning determined by the expression described above. With reference to FIG. 5, description is made of details of the crowning portion 6b formed on the large end surface 4b side of the tapered roller 4. In FIG. 5, for easy understanding of the drop amount of the crowning portion 6b, more emphasis is given as compared to the tapered roller 4 illustrated in FIG. 4. The crowning portion 6b has a complex arc shape formed by smoothly connecting three arcs having large curvature radii R1, R2, and R3 to the straight portion 6a. As the drop amounts of the crowning portion 6b, there are defined a drop amount Dr1 at a first gate, an intermediate drop amount Dr2 at a second gate, and a maximum drop amount Dr3 at a third gate so that the crowning shape approximate to the logarithmic curve is formed. The drop amount Dr3 corresponds to Dr in Description and Claims. Moreover, the drop amount Dr3 corresponds to $z_m$ in Expression 1 described above. With this, surface pressure distribution in the axial direction can be set uniform while avoiding the edge surface pressure. The drop amount depends on the size or the model number, but is about 60 μm at maximum. The crowning portion 6c formed on the small end surface 4a is similar to the crowning portion 6b, and hence description thereof is omitted. The straight portion described in Description and Claims is referred to as a portion having a straight shape and a portion having a substantially straight shape with small crowning.

Regions of the crowning portions 6b and 6c opposed to the ground relief portions 2f and 2g of the inner ring 2 of FIG. 2 are not brought into contact with the inner ring 2. It is not always required that the rolling surface 6 of the tapered roller 4 in this region have the logarithmic crowning, and this region may be the straight shape, the arc, or other function by which the crowning portions 6b and 6c are smoothly connected to each other. With this, the grinding amount is suppressed, and the processing efficiency of the roller is improved, thereby being capable of reducing the manufacturing cost.

Next, as a countermeasure for skew, a width Ls of the straight portion 6a of the rolling surface 6 of the tapered roller 4 having the logarithmic crowning shape illustrated in FIG. 4 is set within the range of from 50% to 85% of the effective rolling surface width Le. As a result of verification, it was found that, when the width Ls of the straight portion 6a is smaller than 50% of the effective rolling surface width Le, there arise problems in that skew is liable to occur and the contact surface pressure increases. Meanwhile, it was found that, when the width Ls of the straight portion 6a is larger than 85% of the effective rolling surface width Le, the processing width for the crowning portions 6b and 6c becomes excessively narrower, with the result that the shape becomes more difficult to manufacture.

For respective ratios of the width Ls of the straight portion 6a with respect to the effective rolling surface width Le of the rolling surface 6 of the tapered roller 4, verification results with regard to the drop amount Dr (Dr3) at the end portions of the crowning portions 6b and 6c, the tangent angle α, ease of processing, and the degree of change in surface contact pressure value are shown in Table 1.

TABLE 1

| | | | | | | |
|---|---|---|---|---|---|---|
| Ratio of width Ls of straight portion with respect to effective rolling surface width Le (Ls/Le) [%] | 45 | 50 | 70 | 80 | 85 | 90 |
| End portion drop amount Dr [μm] | 45 | 46 | 52 | 57 | 60 | 62 |
| Tangent angle α [°] | 1°10' | 1°20' | 1°30' | 1°40' | 2° | 3° |
| Ease of processing | ○ | ○ | ○ | ○ | ○ | x |
| Increase or decrease in contact surface pressure [%] | 1% increase | ±0 | 2% decrease | 3% decrease | 4% decrease | 5% decrease |
| Determination result | x | ○ | ○ | ○ | ○ | x |

As shown in Table 1, as the ratio (Ls/Le) of the width Ls of the straight portion to the effective rolling surface width Le increases, the contact surface pressure decreases, but the tangent angle α at the crowning end portion increases. When the tangent angle α is excessively large, the superfinishing processing cannot be performed on the crowning end portion, with the result that there is a risk of causing defects such as formation of grinding marks. Moreover, there was given a result that, when the ratio (Ls/Le) of the width Ls of the straight portion to the effective rolling surface width Le is small, the contact surface pressure increases, and there is difficulty in application. Based on the verification results described above, when the width Ls of the straight portion 6a of the rolling surface 6 is set within the range of from 50% to 85% of the effective rolling surface width Le, the skew is suppressed, and the contact surface pressure is reduced. Moreover, ease of processing is excellent, and the manufacturing cost can be reduced.

A gap S between the small end surface 4a of the tapered roller 4 and the small flange surface 2d illustrated in FIG. 2 is set to 0.3 mm or less. Thus, the effect of suppressing skew can be attained, and the adapting rotation performed at the time of assembly of the tapered roller bearing 1 is reduced, thereby improving ease of assembly.

When the crowning end portion drop amount Dr (Dr3) to a roller diameter Dw illustrated in FIG. 4 is set within the range of $0.003 \leq Dr/Dw \leq 0.03$, the edge surface pressure can be set to a proper value. When Dr/Dw is smaller than 0.003, the edge surface pressure increases. When Dr/Dw is larger than 0.03, the drop amount Dr becomes excessively larger, with the result that there arises difficulty in manufacture.

When a roller filling ratio γ is set to $90\% < \gamma < 100\%$, a proper contact surface pressure can be obtained. When the roller filling ratio γ is smaller than 90%, the contact surface pressure becomes larger. Thus, a measure such as extension of the roller length is required, with the result that the bearing size increases. The roller filling ratio γ is expressed by the following expression.

Roller filling ratio $\gamma = (Z \cdot DA)/(\Pi \cdot PCD)$

In the expression, Z represents the number of rollers, DA represents a roller average diameter, and PCD represents a roller pitch circle diameter.

FIG. 3 is an illustration of a transverse cross section of the tapered roller bearing according to the first embodiment in which the roller filling ratio γ is 90% or more. A window pressing angle (window angle) θ of a pillar surface 5e of the pillar portion 5d of the retainer 5 is set to, for example, 55° or more and 80° or less. When the roller filling ratio γ is set to 90% or more, the contact surface pressure is reduced, and the anti-fretting characteristic is improved. Moreover, an absolute value of the dynamic rated load Cr itself becomes larger, thereby being capable of securing the fatigue lifetime more stably.

Next, analysis is made on a maximum contact surface pressure for each ratio L/Dw of a roller length L to the roller diameter Dw illustrated in FIG. 4. Maximum contact surface pressures of a standard full-crowning roller having a conventional specification and the tapered roller having the logarithmic crowning in the first embodiment are shown in Table 2. The standard full-crowning roller having the conventional specification has the drop amount of about 5 μm at the end portion, and is close to the straight shape.

TABLE 2

| | Maximum contact surface pressure | |
|---|---|---|
| L/Dw | Standard full-crowning roller | Logarithmic crowning roller |
| 1.25 | 2,500 MPa | 2,550 MPa |
| 1.4 | 2,400 MPa | 2,450 MPa |
| 1.55 | 2,300 MPa | 2,350 MPa |
| 1.7 | 2,200 MPa | 2,250 MPa |
| 1.85 | 2,100 MPa | 2,150 MPa |
| 2.0 | 1,950 MPa | 2,000 MPa |

<Bearing Conditions>
Ratio of rolling surface straight portion width (Ls/Le): 50%
Crowning end portion drop amount (Dr/Dw): 0.00367
Roller filling ratio γ: 94%
Bearing axial gap: 0.1 mm As shown in Table 2, when the logarithmic crowning is applied, a maximum contact surface pressure value increases slightly (about 2%) as compared to the standard full-crowning roller. However, the maximum contact surface pressure value can be set so as to be close to that of the standard full-crowning roller through adjustment of the ratio (Ls/Le) of the rolling surface straight portion width. It could be verified that, in order to set the maximum contact surface pressure value to be 2,200 Mpa or less which is capable of suppressing the fretting wear and is obtained by the test result, the ratio L/Dw of 1.7 or more, that is, the design concept placing importance on the static rated load $C_{0}r$ is required also for the roller having the logarithmic curve crowning.

Figure 6:
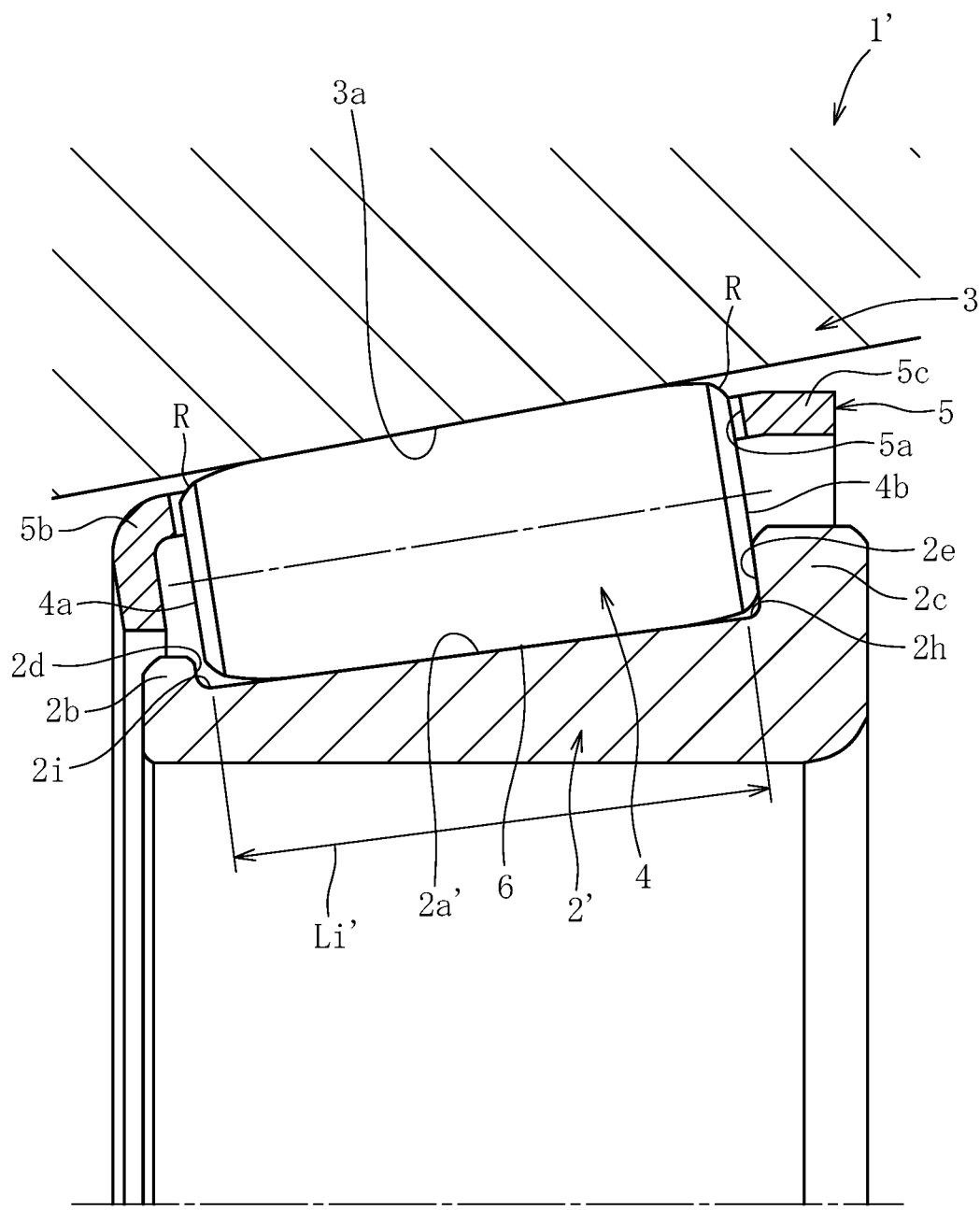
FIG. 6 is a vertical sectional view of a tapered roller bearing according to a second embodiment of the present invention.
Figure 7:
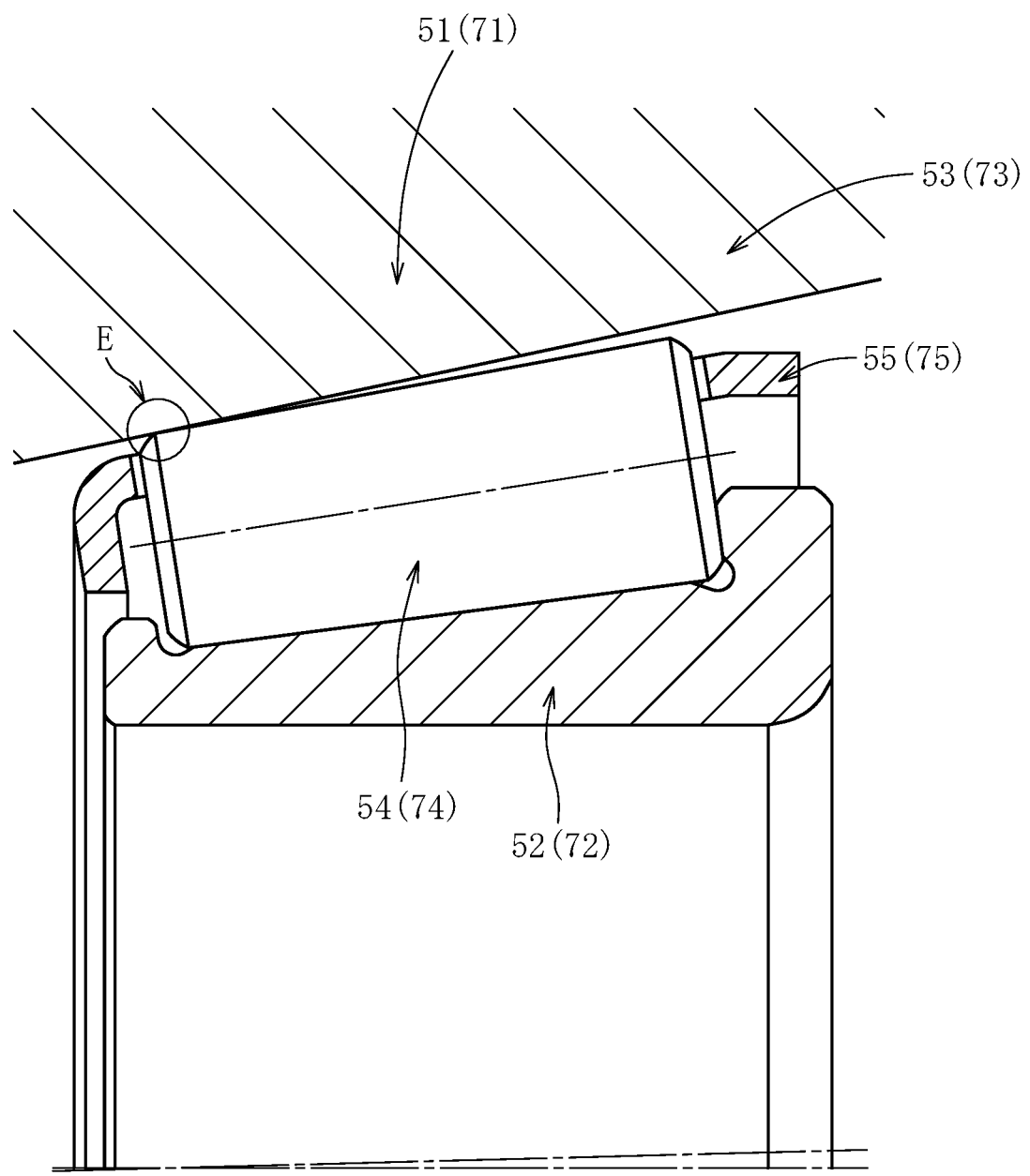
FIG. 7 is a vertical sectional view of a tapered roller bearing for illustrating findings obtained in the course of development.

Next, with reference to FIG. 6, description is made of a tapered roller bearing according to a second embodiment of the present invention. A tapered roller bearing 1' according to the second embodiment is different from the first embodiment in mode of a raceway surface 2a' of an inner ring 2'. Parts having the same functions as those of the tapered roller bearing according to the first embodiment are denoted by the same reference symbols, and only relevant points are described.

The inner ring 2' has the raceway surface 2a' having a tapered shape on an outer periphery thereof. The inner ring 2' has the small flange portion 2b on the small-diameter side, and has the large flange portion 2c on the large-diameter side. The generating line of the raceway surface 2a' extending in the axial direction has a linear shape. At a corner portion at which the raceway surface 2a' and the large flange surface 2e of the large flange portion 2c intersect each other, the ground relief portion is not formed, and a corner round portion 2h having a curvature radius smaller than that of a roller end portion chamfered portion R is formed. Similarly, at a corner portion at which the raceway surface 2a' and the small flange surface 2d of the small flange portion 2b intersect each other, the ground relief portion is not formed, and a corner round portion 2i having a curvature radius smaller than that of the roller end portion chamfered portion R is formed.

The raceway surface 2a' of the inner ring 2' in the second embodiment does not have the ground relief portion. Therefore, in contrast to the first embodiment described above, an effective raceway surface width Li' of the raceway surface 2a' is larger than the effective rolling surface width Le (see FIG. 4) of the rolling surface 6 of the tapered roller 4. With this, the surface pressure can be further reduced. Moreover, when the effective raceway surface width Li' of the raceway surface 2a' is set so as to be larger than the effective rolling surface width Le of the rolling surface 6 of the tapered roller 4, superfinishing on the raceway surface 2a' is omitted, and the raceway surface 2a' is subjected to finish-grinding. Thus, the roughness can be reduced to the range of from 0.1 μm to 0.4 μm, thereby being capable of reducing the cost.

Other configurations and actions are the same as those of the first embodiment. Therefore, contents of the description in the first embodiment are similarly applied, and description thereof is omitted.

With regard to the tapered roller bearing according to the first embodiment and the tapered roller bearing according to the second embodiment, analysis on the contact surface pressure simulating the use condition such as usage for a truck was conducted. Analysis results are shown in Table 3.

TABLE 3

| | Raceway surface contact surface pressure (MPa) | | | |
| --- | --- | --- | --- | --- |
| | Inner ring side | | Outer ring side | |
| | Maximum contact surface pressure | Edge surface pressure | Maximum contact surface pressure | Edge surface pressure |
| First embodiment | 2,250 | 0 | 1,670 | 0 |
| Second embodiment | 2,054 | 0 | 1,650 | 0 |

<Bearing Conditions>
Ratio of rolling surface straight portion width (Ls/Le): 50%
Crowning end portion drop amount (Dr/Dw): 0.00367
Roller filling ratio γ: 94%
Bearing axial gap: 0.1 mm As shown in Table 3, generation of the edge surface pressure could be prevented in both the first and second embodiments. Moreover, it could be verified that the maximum contact surface pressure could be suppressed to the range capable of suppressing the fretting wear.

In the first and second embodiments, description is made of the tapered roller bearings 1 and 1' for the pilot portion as an example. However, except for the double-row configuration, other configurations and actions of the tapered roller bearing 21 for the idler portion are similar to those of the tapered roller bearings 1 and 1' for the pilot portion. Therefore, the contents described above are similarly applied, and description thereof is omitted.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

DESCRIPTION OF REFERENCE SIGNS 1, 1' tapered roller bearing for pilot portion
2, 2' inner ring
2a, 2a' raceway surface
2b small flange portion
2c large flange portion
2d small flange surface
2e large flange surface
2f ground relief portion
2g ground relief portion
2h corner round portion
2i corner round portion
3 outer ring
4 tapered roller
4a small end surface
4b large end surface
5 retainer
6 rolling surface
6a straight portion
6b crowning portion
6c crowning portion
21 tapered roller bearing for idler portion
22 inner ring
23 outer ring
24 tapered roller
25 retainer
Dr crowning end portion drop amount
Dw roller diameter
L roller length
Le effective rolling surface width
Li effective raceway surface width
Li' effective raceway surface width
Ls width of straight portion

The invention claimed is:
1. A tapered roller bearing which is to be used for a pilot portion and an idler portion of a synchronous mesh-type transmission in which a component corresponding to a bearing outer ring is formed of a gear, the tapered roller bearing comprising a tapered roller,
wherein a ratio L/Dw of a length (L) of the tapered roller serving as a rolling element to a roller diameter (Dw) of the tapered roller is set to 1.7 or more, wherein a rolling surface of the tapered roller comprises a straight portion in a center portion of the rolling surface in an axial direction and crowning portions extending from the straight portion to both end portions, wherein the crowning portions are each formed of logarithmic crowning, and wherein a ratio Dr/Dw of a drop amount (Dr) of one of the crowning portions of the rolling surface to the roller diameter (Dw) falls within a range of from 0.003 to 0.03.

2. The tapered roller bearing according to claim 1, wherein a width of the straight portion falls within a range of from 50% to 85% of an effective rolling surface width of the tapered roller.

3. The tapered roller bearing according to claim 1, wherein a roller filling ratio of the tapered roller bearing is 90% or more.

4. The tapered roller bearing according to claim 1, wherein an effective raceway surface width of an inner ring of the tapered roller bearing is larger than an effective rolling surface width of the tapered roller, and wherein a raceway surface of the inner ring comprises a grind-finished surface having a roughness within a range of from 0.1 μRa to 0.4 μRa.

5. The tapered roller bearing according to claim 1, wherein a gap formed between a small flange surface of an inner ring of the tapered roller bearing and a small end surface of the tapered roller of the tapered roller bearing is 0.3 mm or less.

* * * * *